Figure 1:
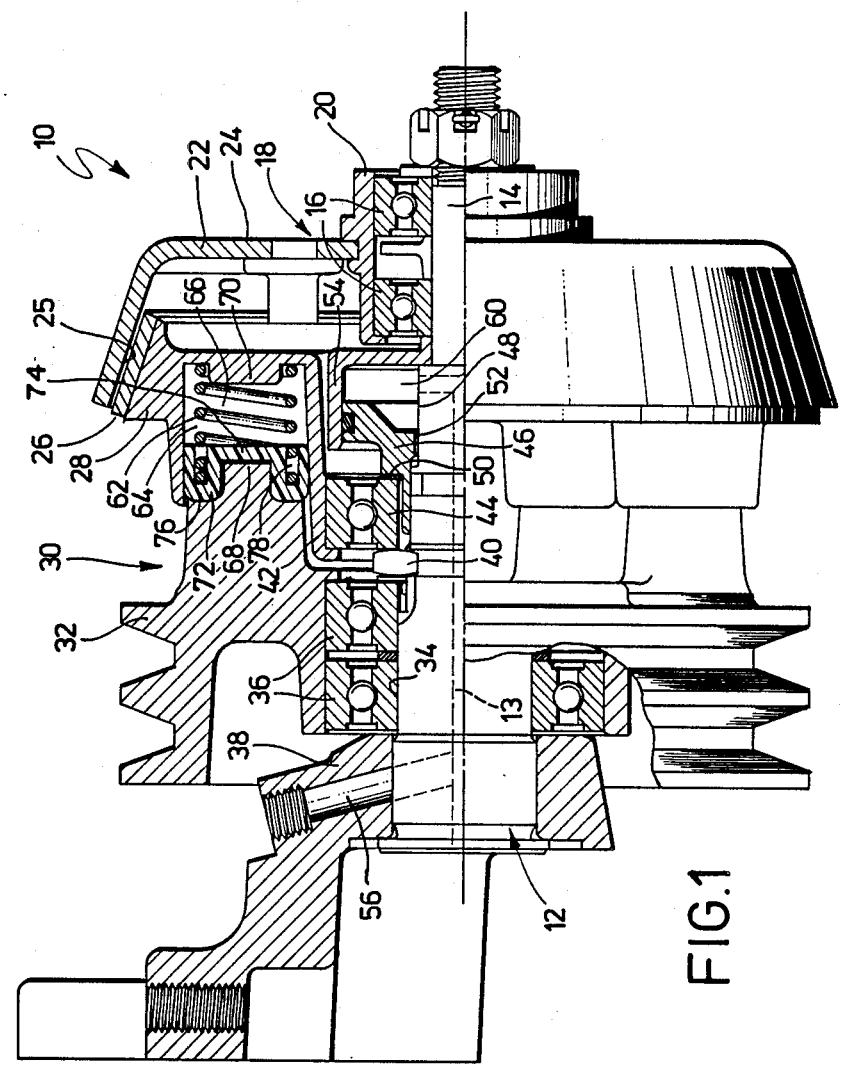

United States Patent [19]

Hall et al.

[11] Patent Number: 4,830,161

[45] Date of Patent: May 16, 1989

[54] FAN CLUTCH

[75] Inventors: John L. Hall, Strongsville; David T. Fenzel, Grafton; Dennis R. Shamine, Lorain, all of Ohio

[73] Assignee: Allied-Signal Inc., Morristown, N.J.

[21] Appl. No.: 102,051

[22] Filed: Sep. 25, 1987

[51] Int. Cl.⁴ .................. F16D 3/10; F16D 25/063
[52] U.S. Cl. .................. 192/91 A; 192/85 CA 106.1; 192/106.2; 464/65
[58] Field of Search ............ 192/91 A, 106.2, 106.1, 192/85 CA; 464/65, 81

[56] References Cited

U.S. PATENT DOCUMENTS

| | | | |
|---|---|---|---|
| 1,365,957 | 1/1921 | Smith | 464/65 |
| 1,783,158 | 11/1930 | Eckart | 464/65 |
| 2,068,579 | 1/1937 | Tatter | 192/91 A |
| 4,515,258 | 5/1985 | Johnson | 192/91 A |
| 4,639,237 | 1/1987 | Fukuda | 464/65 |

FOREIGN PATENT DOCUMENTS

| | | | |
|---|---|---|---|
| 399648 | 10/1973 | U.S.S.R. | 464/65 |
| 566118 | 12/1944 | United Kingdom | 464/65 |

Primary Examiner—Rodney H. Bonck
Attorney, Agent, or Firm—Ken C. Decker; William N. Antonis

[57] ABSTRACT

A clutch drive for a vehicle engine cooling fan includes a pulley portion which is driven by the vehicle engine, a fan plate which rotatably mounts the engine cooling fan, and a pressure plate which engages the fan plate to drive the latter when the clutch is engaged. Torque transmission from the pulley to the pressure plate is through a series of circumferentially spaced coiled springs which also yieldable urge the pressure plate into driving engagement with the fan plate. A spring stabilizer defines a circumferentially extending cavity which receives several coils of the spring to stabilize the latter and to prevent displacement of the coils circumferentially with respect to each other during engagement and disengagement of the clutch. The stabilizer also slidably engages both the pressure plate and the pulley, thereby taking up clearances between the various members to prevent rattling and also to assist in the transmission of torque to the pressure plate.

9 Claims, 1 Drawing Sheet

FAN CLUTCH

This invention relates to a clutch drive for the engine cooling fan of an automotive vehicle.

Modern medium and heavy duty trucks are equipped with engine cooling fans which consume a substantial portion of the power generated by the engine even though their cooling effect is needed relatively infrequently during normal operation of the vehicle. Accordingly, it has become customary to equip engines of this type with a clutch drive which controls engagement and disengagement of the engine cooling fan in response to changes in coolant temperature. One problem of prior art cooling fan clutches is that their various components tended to wear relatively quickly, in large part because of the shock loads generated during engagement and disengagement of the clutch drive. Accordingly, U.S. Pat. No. 4,515,258 discloses a clutch drive for a vehicle engine cooling fan in which the torque necessary to drive the fan is transmitted to the fan through coiled springs which also yieldably urge the pressure plate of the clutch drive into driving engagement with the rotating fan plate upon which the engine cooling fan is mounted. Since torque in this prior art clutch drive is transmitted through the coiled springs, the shock loads were substantially attenuated, thereby increasing the life of the various components of the fan clutch.

The present invention is an improvement in the fan clutch drive disclosed in the above-identified patent. The fan clutch drive according to the present invention includes a spring stabilizer which resists deformation of the springs through which the torque is transmitted, thereby making the drive more efficient. The spring stabilizer also prevents noise due to vibration and movement of the springs relative to the clutch drive, and also transmits a portion of the torque to the fan.

These and other advantages of the invention will become apparent from the following description, with reference to the accompanying drawings, the sole FIGURE of which is a longitudinal partial cross-sectional view of a clutch drive made pursuant to the teachings of the present invention.

Referring now to the drawing, a fan drive generally indicated by the numeral 10 includes a stepped spindle 12 having a smaller diameter portion 14 which mounts roller bearings 16. A driven member generally indicated by the numeral 18 includes a hub 20 which is mounted for rotation about the spindle 12 by the bearings 16. A fan plate 22 is swaged to the hub 20 for rotation therewith. A conventional engine cooling fan (not shown) is mounted on the fan plate 22 by bolts threaded into weld nuts 24. The fan plate 22 terminates in a clutch engagement surface 25 which is adapted to be engaged by friction material 26 mounted on a pressure plate 28 which, as will hereinafter be described, is mounted for both rotative and slidable movement with respect to the spindle 12.

The pressure plate 28 is one portion of a fan driving member generally indicated by the numeral 30. In addition to the pressure plate portion 28, driving member 30 includes a pulley portion 32 which is rotatably mounted on larger diameter portion 34 of spindle 12 by roller bearings 36. The pulley portion 32 is fixed axially with respect to the spindle 12, and is driven by the fan belt of the vehicle engine. The bearings 36 are held in place by mounting bracket 38 and by retaining nut 40 which is threaded on spindle 12. Bracket 38 is secured to a nonrotative portion of the vehicle and supports the spindle 12. The pressure plate 28 includes an axially extending hat portion 42. A bearing 44 is pressed into hat portion 42, so that the bearing 44 is supported by the hat section 42 a small radial distance from the spindle 12.

The pressure plate 28 is moved away from the engagement surface 25 by a piston 46 which is slidably mounted on intermediate diameter portion 48 of the spindle 12. A shoulder 50 on the piston 46 engages the inner race of the bearing 44, so that the piston 46, bearing 44 and pressure plate 28 are moved conjointly along the axis of the spindle 12. Since the bearing 44 is pressed into hat section 42 of the pressure plate 28, the piston 46 does not support the weight of the pressure plate 28, but only moves axially with the latter. Rotation of the piston 46 about the spindle 12 is prevented by matching flats 52 on the piston 46 and on the intermediate diameter portion 48. The piston 46 is slidably received within a cylinder member 54 which is held on the spindle 12 between the shoulder between the intermediate diameter portion 48 and smaller diameter portion 14 of the latter and the inner race of one of the bearings 16. A passage 56 communicates compressed air from an appropriate compressed air source through the spindle 12 into a chamber 60 to operate the piston 46. Communication of compressed air into the chamber 60 is controlled by a conventionally controlled thermally responsive valve (not shown) which is responsive to, for example, engine coolant temperature to either initiate or discontinue communication of compressed air into the chamber 60.

Circumferentially spaced, spirally wound coiled srpings generally indicated by the numeral 62 are mounted in circumferentially spaced pockets 64 carried by the pressure plate 28. The coils of the springs 62 define a cavity 66 therewithin which receives axially projecting bosses 68, 70 which project axially from the pulley portion 32 and from the pressure plate portion 28. A spring stabilizer 72 in each pocket 64 includes a projecting portion 74 which receives the boss 68. A circumferentially extending skirt 76 slidably engages the wall of the pockets 64 and cooperates with the projecting portion 74 to define a circumferentially extending cavity 78 therebetween, which receives several coils of the spring 62.

In operation, springs 62 yieldably urge the pressure plate 28 into driving engagement with the fan plate 22, so that torque transmitted from the vehicle engine to the pulley portion 32 is transmitted to the fan plate 22 through the pressure plate 28. A driving connection for transmitting torque between the pulley portion 32 and the pressure plate 28 is through the coiled springs 62. Accordingly, the assembly is not subjected to undesirable shock loads as were prior art designs, since these coil springs 62 inherently provide some accommodation to the shock loads which would otherwise be transmitted between the rotating members upon engagement and disengagement of the clutch. However, the resilience of the springs, which provides this shock absorbing function, also results in displacement of some of the coils of the spring relative to one another. Accordingly, some of the the coils of the spring are received within the cavity 78 of the spring stabilizer 72. This cavity in the spring stabilizer resists displacement of the various coils of the spring with respect to other coils of the spring, thereby rendering the springs 62 more efficient in transmitting torque. The engagement of the skirt 76 with the wall of the pocket 64 also transmits some of the torque between the pulley portion 32 and the pressure plate 28, thereby reducing the torque that must be transmitted through the springs 62. Since the skirt 76 is engaged with the wall of the bore, and the cavity 78 receives the coils of the spring with relatively little clearance, the spring stabilizer 72 takes up the clearance betweeen the spring, the pulley portion 32, and the pressure plate portion 28, thereby inhibiting rattling of the various parts of the assembly. Ideally, the spring stabilizer 72 is made of plastic or some other somewhat pliant material, so that it can readily deflect and absorb relative movement between the various components.

When the clutch is to be disengaged, the aforementioned temperature responsive valve (not shown) communicates air pressure into the chamber 60, thereby urging the piston 46 to the left viewing the FIGURE. Movement of the piston 46 carries the pressure plate 28 away from the fan plate 22, since the piston 46 is engaged with the inner race of the bearing 44.

We claim:

1. Clutch drive mechanism comprising a spindle, a driven member mounted for rotation about said spindle, a driving member mounted for rotation about said spindle, pressure responsive means for controlling the driving engagement between the driving and driven members, said driving member including an axially fixed portion mounted for rotation about said spindle and a pressure plate portion mounted for rotation about said spindle and slidably mounted for movement axially on said spindle toward and away from the driven member, and yieldable means disposed between said pressure plate portion and said axially fixed portion for both urging said pressure plate portion into driving engagement with said driven member and for transmitting torque from said axially fixed portion to said pressure plate portion, said yieldable means including a spring having spirally wound coils disposed between said portions and spring stabilizing means between one of said portions and a corresponding end of said spring for inhibiting the torque transmitted through the spring from displacing the coils of said spring relative to one another during driving engagement of said pressure plate portion with said driven member, said spring stabilizing means defining a circumferentially extending cavity receiving one end of said spring and including an axially extending skirt defining said cavity and extending along the outer circumferential surface defined by the coils of said spring, said pressure plate portion including a pocket receiving said spring and said spring stabilizing means, said pocket being defined by a wall, said skirt slidably engaging said wall.

2. Clutch drive mechanism as claimed in claim 1, wherein said spring stabilizing means is made out of a deformable nonmetallic material.

3. Clutch drive mechanism as claimed in claim 1, wherein a boss projects from said one portion, said spring receiving said boss within a cavity defined by said coils.

4. Clutch drive mechanism as claimed in claim 3, wherein said boss projects into said pocket, and said spring stabilizing means includes a projecting section receiving said boss, said circumferentially extending cavity circumscribing said projecting section.

5. Clutch drive mechanism comprising a spindle, a driven member mounted for rotation about said spindle, a driving member mounted for rotation about said spindle, pressure responsive means for controlling the driving engagement between the driving and driven members, said driving member including an axially fixed portion mounted for rotation about said spindle and a pressure plate portion mounted for rotation about said spindle and slidably mounted for movement axially on said spindle toward and away from the driven member, and yieldable means disposed between said pressure plate portion and said axially fixed portion for both urging said pressure plate portion into driving engagement with said driven member and for transmitting torque from said axially fixed portion to said pressure plate portion, said yiedlable means including a spring having spirally wound coils disposed between said portions and spring stabilizing means between one of said portions and a corresponding end of said spring for inhibiting the torque transmitted through the spring from displacing the coils of said spring relative to one another during driving engagement of said pressure plate portion with said driven member, said spring stabilizing means including an axially extending skirt defining a cavity receiving one end of said spring, the other portion including a wall slidably engaging said skirt.

6. Clutch drive mechanism as claimed in claim 5, wherein said wall extends circumferentially around said skirt to define a pocket receiving said spring stabilizing means and said one end of the spring.

7. Clutch drive mechanism as claimed in claim 5, wherein said spring stabilizing means is made out of a deformable nonmetallic material.

8. Clutch drive mechanism as claimed in claim 6, wherein a boss projects from said one portion, said spring receiving said boss within a cavity defined by said coils.

9. Clutch drive mechanism as claimed in claim 8, wherein said boss projects into said pocket, and said spring stabilizing means includes a projecting section receiving said boss, said circumferentially extending cavity circumscribing said projecting section.

* * * * *